A. V. AND J. S. GULLBORG.
SWIVEL COUPLING.
APPLICATION FILED APR. 21, 1919.
1,366,381. Patented Jan. 25, 1921.
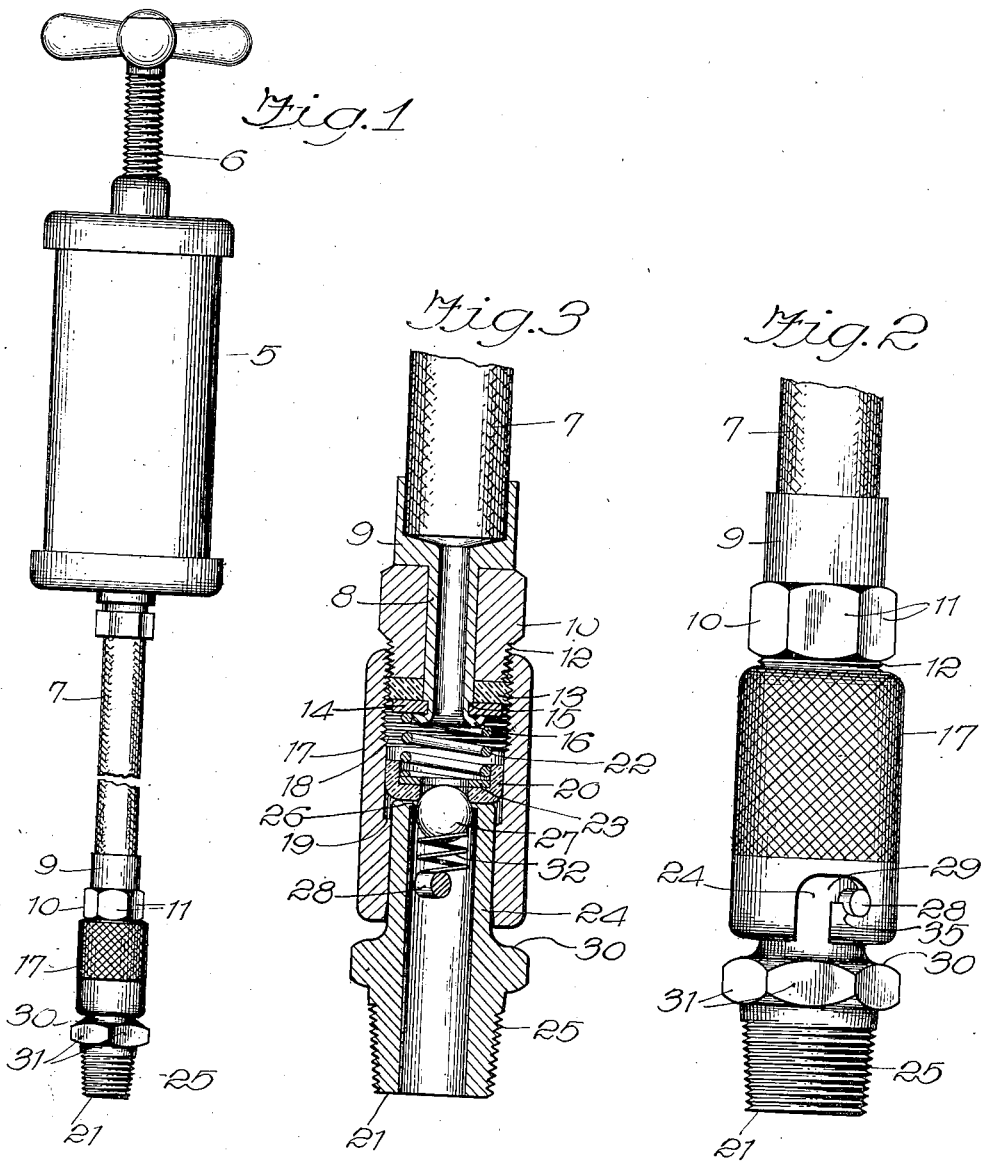

UNITED STATES PATENT OFFICE.

ARTHUR V. GULLBORG AND JOHN S. GULLBORG, OF CHICAGO, ILLINOIS, ASSIGNORS, BY MESNE ASSIGNMENTS, TO THE BASSICK MANUFACTURING COMPANY, A CORPORATION OF DELAWARE.

SWIVEL-COUPLING.

1,366,381.   Specification of Letters Patent.   Patented Jan. 25, 1921.

Application filed April 21, 1919. Serial No. 291,607.

*To all whom it may concern:*

Be it known that we, ARTHUR V. GULLBORG and JOHN S. GULLBORG, citizens of the United States, residing at Chicago, in the county of Cook and State of Illinois, have invented certain new and useful Improvements in Swivel-Couplings, (Case 1,) of which the following is a full, clear, concise, and exact description, reference being had to the accompanying drawings, forming a part of this specification.

Our invention relates to swivel couplings and is especially concerned with the provision of a swivel coupling to be used in connection with lubricating apparatus such as that disclosed in the co-pending applications of Arthur V. Gullborg, Serial Nos. 216,586 and 267,858, filed respectively on February 11, 1918 and December 21, 1918.

The objects of our invention are:

First: to provide a coupling which will facilitate the connection of the discharge conduit of the grease gun with the coupling member which is permanently secured to the bearing;

Second: to provide a coupling of this character which is simple in construction and economical to manufacture; and Third: to provide a coupling for the above purpose which effectively prevents the leakage of lubricant therefrom, even when the lubricant is compressed under high pressure.

Other objects will appear as this description progresses, reference being had to the accompanying drawing, in which:

Figure 1 is a side elevation of a grease gun, the discharge conduit of which is provided with our improved swivel coupling shown connected with a coupling member adapted to be secured to a bearing;

Fig. 2 is a side elevation on an enlarged scale, of our improved coupling member, showing it attached to a coupling member adapted to be secured to a bearing to be lubricated; and Fig. 3 is a central longitudinal section through Fig. 2, taken substantially on the plane of the drawing.

In the several views similar reference characters will be used to refer to similar parts.

In the above mentioned applications of Arthur V. Gullborg, certain lubricating apparatus is disclosed which comprises a grease gun having a flexible conduit ending in a coupling member, which is adapted to be secured to other coupling members that are permanently attached to the bearings to be lubricated. In these applications the one coupling member is rigidly secured to the discharge conduit, and both members are provided with coacting means forming a bayonet coupling by means of which the two coupling members may be secured together. In order to secure the coupling member on the end of the discharge conduit to the coupling member which is attached to the bearing, it is necessary either to turn the entire grease gun and its flexible discharge conduit or to turn the coupling member secured to the discharge conduit against the torsion of the flexible conduit. One of the purposes of our present invention is to provide means which will permit of this connection between the two coupling members more easily and expeditiously.

Referring to the drawings the reference character 5 indicates the barrel or cylinder of a grease gun, which is provided with a plunger (not shown) having a screw-threaded piston rod 6. The grease gun is provided with a flexible discharge conduit 7, which is preferably made of braided metal or other similar material which will withstand comparatively high pressures. Our improved swivel coupling comprises a tubular member 8 having one end enlarged as shown at 9, and provided with a bearing for receiving the free end of the discharge conduit 7. Preferably the end of the conduit 7 is soldered or otherwise secured to the enlarged end 9. A plug 10 is rotatably mounted upon the tubular member 8, and one end thereof bears against the enlarged portion 9 of the tubular member. The plug 10 is provided with facets 11 adjacent the last mentioned end to receive the jaws of a wrench or other tool, by means of which it can be rotated. The other end of the plug 10 is screw-threaded as shown at 12, this thread preferably being a pipe thread. A gasket 13 rests against the screw-threaded end of the plug 11, and is held in place by means of a washer 14, which rests against a shoulder 15 formed adjacent the end of the tubular member 8. The extreme end of the tubular member 8 is swaged over as shown at 16, to hold the washer in place.

A sleeve 17 is provided with internal threads 18 which co-act with the screw-threads of the plug 10 to secure these two members together. The bore of the sleeve 17 is provided with an inwardly extending shoulder 19 against which the cup leather 20 is adapted to rest when the sleeve 17 is detached from the coupling member 21. The cup leather 20 is urged against the shoulder 19 by means of a spiral spring 22, one end of which rests against the washer 14 and is centered by the swaged over end 16 of the tube 8. The other end of the spring 22 rests against a washer 23 in the cup leather.

The coupling member 21, with which the improved swivel coupling of our invention is designed to co-act, and which is described in the first mentioned application of Arthur V. Gullborg, *supra*, comprises a tubular member 24 having one end screw-threaded at 25 to provide means for connecting it with a bearing, and the other end swaged over as shown at 26, to provide a seat for the ball closure 27. A pin 28 extends through the sides of the tubular member and from both sides thereof, and co-acts with bayonet slots 29 formed in the sleeve 17. A flange 30 formed intermediate the ends of the coupling member is provided with facets 31 for co-acting with the jaws of a wrench. This flange is spaced sufficiently from the end of the tubular member 24, which is flanged over to permit this end to raise the cup leather 20 from its seat when the two coupling members 17 and 21 are brought into co-acting relation so as to provide an efficient seal between the cup leather and the flanged over end of the coupling member 21. A spring 32, confined between the pin 28 and the closures 27 provides means for yieldingly retaining the closure 27 in its closed position.

It is believed that the operation of our improved coupling will be clear from the above description. When it is desired to connect our coupling member with a coupling member 21, it is merely necessary to bring the sleeve 17 into registering position with the flanged over end of the coupling member 21, whereupon the sleeve 17 can be pushed over the end of the coupling member 21, and the pin 28 and slot 29 brought into co-acting relation by giving the sleeve 17 a slight rotary movement. At the same time the cup leather 20 is raised from its seat formed by the shoulder 19 and forms a seal between the sleeve 17 and the coupling member 21. It will be noted that one side of the slot 29 is recessed, as shown at 35, to receive the pin 28, so that the two coupling members cannot be uncoupled except after an initial movement of the sleeve 17 toward the flange 30 against the tension of the spring 22.

While we have described the details of the preferred embodiment of our invention, it is to be clearly understood that it is capable of other adaptations and modifications within the scope of the appended claims.

Having thus described our invention, what we claim is:

1. A swivel coupling comprising a tubular member having one end enlarged and provided with a bearing for receiving a conduit, a screwthreaded plug rotatably mounted on said tubular member and having one end abutting against said enlarged end, a gasket resting against the other end of said plug, a washer on said tubular member for securing said gasket in place, the end of said tubular member being swaged over to hold said washer against said gasket, a sleeve having one end screw-threaded onto said plug, the bore of said sleeve being provided with a shoulder, a cup leather resting against said shoulder with its flange extending toward said plug, and a spiral spring between said cup leather and said washer, for holding said cup leather against said shoulder, the end of said spring adjacent said washer being centered by the swaged over end of said tube.

2. A swivel coupling comprising a tubular member, a screwthreaded plug rotatably mounted on said tubular member, a gasket resting against one end of said plug, a sleeve having one end screwthreaded onto said plug, the bore of said sleeve being provided with a shoulder, a cup leather resting against said shoulder and projecting into the bore of said sleeve, and a spiral spring for holding said cup leather against said shoulder.

3. A swivel coupling comprising a tubular member, a plug rotatably mounted on said tubular member, a sleeve having one end secured to said plug, a single gasket for sealing the joint between said tubular member and said plug and the joint between said plug and said sleeve, a cup leather slidably mounted in said sleeve and projecting into the bore of said sleeve for making contact with a tubular member inserted in the other end of said sleeve, and a spring confined between said plug and said cup leather for urging said cup leather toward the end of said sleeve opposite said plug.

4. A swivel coupling comprising a tubular member, a sleeve rotatably mounted on said tubular member, means for sealing the connection between said tubular member and said sleeve, a cup leather in said sleeve, the side of the cup leather adjacent said tubular member being subjected to the pressure of the fluid in said sleeve and a spring for urging said cup leather away from said tubular member.

5. A coupling comprising two members, one of which fits within the other, means for establishing a quick detachable connection between said members, a perforated gasket slidable in one of said members, means for holding said gasket in contact with the other of said members, a tubular member swiveled onto one of said members and a gasket interposed between said last named member and said tubular member.

6. A coupling comprising two members, one of which fits within the other, means for detachably connecting said members together and holding them against rotation, a gasket slidably mounted in one of the said members and contacting with the other of said members, and means for rotatably connecting the end of a conduit with said member in which said gasket is slidably mounted, whereby said conduit can be rotated relatively to said last named member without moving said last named member relatively to said gasket.

In witness whereof, we hereunto subscribe our names this 16 day of April, 1919.

ARTHUR V. GULLBORG.
JOHN S. GULLBORG.

Witnesses:
 JOHN L. STEFFEN,
 GEO. P. ADAMS.